(12) United States Patent
Coleman et al.

(10) Patent No.: US 8,486,469 B2
(45) Date of Patent: Jul. 16, 2013

(54) LOW-CALORIE FOOD BAR

(75) Inventors: Edward C. Coleman, New Fairfield, CT (US); Abigail Schmid, Guttenberg, NJ (US); Michael Miklus, Colchester, VT (US)

(73) Assignee: Intercontinental Great Brands LLC, East Hanover, NJ (US)

( * ) Notice: Subject to any disclaimer, the term of this patent is extended or adjusted under 35 U.S.C. 154(b) by 1801 days.

(21) Appl. No.: 11/250,425

(22) Filed: Oct. 17, 2005

(65) Prior Publication Data

US 2007/0087084 A1  Apr. 19, 2007

(51) Int. Cl.
*A23L 1/30* (2006.01)
*A23G 3/00* (2006.01)

(52) U.S. Cl.
USPC ............................ 426/74; 426/246; 426/660

(58) Field of Classification Search
USPC .................... 426/74, 89, 549, 572, 658, 660
See application file for complete search history.

(56) References Cited

U.S. PATENT DOCUMENTS

| | | |
|---|---|---|
| 3,901,977 A | 8/1975 | Rebane |
| 4,145,448 A | 3/1979 | Hayward et al. |
| 4,152,463 A | 5/1979 | Hayward et al. |
| 4,565,702 A | 1/1986 | Morley et al. |
| 4,859,475 A | 8/1989 | Michnowski |
| 4,871,557 A | 10/1989 | Linscott |
| 5,009,916 A | 4/1991 | Colliopoulos |
| 5,071,669 A | 12/1991 | Seiden |
| 5,360,618 A | 11/1994 | Walker |
| 5,389,395 A | 2/1995 | Joseph et al. |
| 5,612,074 A | 3/1997 | Leach |
| 5,792,754 A | 8/1998 | Green et al. |
| 5,866,189 A | 2/1999 | Garwood et al. |
| 5,866,555 A | 2/1999 | Bell et al. |
| 5,906,833 A | 5/1999 | Klatz |
| 6,063,432 A | 5/2000 | Maxwell et al. |
| 6,156,738 A | 12/2000 | Bell et al. |
| 6,399,133 B2* | 6/2002 | Dubberke ............... 426/552 |
| 6,419,911 B1 | 7/2002 | Bailey |
| 6,432,457 B1 | 8/2002 | Jones |

(Continued)

FOREIGN PATENT DOCUMENTS

| | | |
|---|---|---|
| EP | 1169923 B1 | 9/2005 |
| WO | WO-97/05789 A | 2/1997 |

(Continued)

OTHER PUBLICATIONS

Tsang, Gloria, Fiber 101: Soluble vs Insoluble Fiber, http://www.healthcastle.com/fiber-solubleinsolubles.shtml, pp. 1-2 Oct. 10, 2004, date obtained from http://web.archive.org.*

*Primary Examiner* — Kelly Bekker
(74) *Attorney, Agent, or Firm* — Fitch, Even, Tabin & Flannery LLP

(57) ABSTRACT

A low-calorie nutrition energy food bar with high fiber and reduced sugar alcohol contents, which have excellent flavor and multi-texture properties, is provided. The food bar has less than 110 Cal/28 g serving, and includes a core component comprising, as a unitary matrix, protein crisps, caramel, water-soluble dietary fiber, and a binder system; a caramel component; and the core component and caramel components are enrobed with a compound coating layer. The low-calorie food bar has a high protein core component and a caramel component formulated with high water-soluble dietary fiber content which is cohesive, crunchy yet soft/moist enough to be chewable, and flavorful throughout the product's shelf life.

28 Claims, 6 Drawing Sheets

U.S. PATENT DOCUMENTS

| | | |
|---|---|---|
| 6,482,465 B1 | 11/2002 | Cherukuri et al. |
| 6,517,886 B1 | 2/2003 | Chau et al. |
| 6,562,392 B1 * | 5/2003 | Rapp et al. .................... 426/548 |
| 6,586,031 B1 | 7/2003 | Kelly |
| 6,592,915 B1 | 7/2003 | Froseth et al. |
| 6,607,760 B2 | 8/2003 | Burri et al. |
| 6,676,982 B2 | 1/2004 | Mody |
| 6,713,100 B1 | 3/2004 | Schmoutz et al. |
| 6,720,015 B2 | 4/2004 | Prosise et al. |
| 6,726,943 B2 | 4/2004 | Prosise et al. |
| 6,740,350 B2 | 5/2004 | Pfeiffer |
| 6,749,886 B2 | 6/2004 | Jones |
| D495,851 S | 9/2004 | Funk et al. |
| 6,827,955 B2 | 12/2004 | McCabe |
| 6,830,766 B2 | 12/2004 | McCabe |
| 6,837,682 B2 | 1/2005 | Evenson et al. |
| 6,849,281 B2 | 2/2005 | Bodor et al. |
| 6,884,454 B2 | 4/2005 | Pimentel |
| 6,899,905 B2 | 5/2005 | Prosise et al. |
| 6,905,702 B1 | 6/2005 | Kaufman |
| 2002/0034574 A1 | 3/2002 | Prosise et al. |
| 2002/0094359 A1 | 7/2002 | Prosise et al. |
| 2002/0102330 A1 | 8/2002 | Schramm et al. |
| 2002/0127319 A1 | 9/2002 | Gare |
| 2002/0150649 A1 | 10/2002 | Bell |
| 2002/0168448 A1 * | 11/2002 | Mody ............................ 426/74 |
| 2002/0192265 A1 | 12/2002 | Manning et al. |
| 2003/0017233 A1 | 1/2003 | Kemeny |
| 2003/0054089 A1 | 3/2003 | Prosise et al. |
| 2003/0068419 A1 | 4/2003 | Pollard et al. |
| 2003/0087004 A1 | 5/2003 | Kemeny |
| 2003/0091697 A1 | 5/2003 | Froseth et al. |
| 2003/0138520 A1 | 7/2003 | Bell et al. |
| 2003/0147939 A1 | 8/2003 | King et al. |
| 2003/0161914 A1 | 8/2003 | Sault et al. |
| 2003/0190401 A1 | 10/2003 | Singh |
| 2003/0215556 A1 | 11/2003 | Naber et al. |
| 2004/0013771 A1 | 1/2004 | Funk et al. |
| 2004/0071828 A1 | 4/2004 | Troy et al. |
| 2004/0086600 A1 | 5/2004 | Rapp et al. |
| 2004/0142093 A1 | 7/2004 | Jones |
| 2004/0166203 A1 | 8/2004 | Gautam et al. |
| 2004/0170743 A1 | 9/2004 | Akashe et al. |
| 2004/0224068 A1 | 11/2004 | Lee |
| 2004/0228951 A1 | 11/2004 | Schmidt |
| 2005/0002989 A1 | 1/2005 | Palmer et al. |
| 2005/0037125 A1 | 2/2005 | Maningat et al. |
| 2005/0069625 A1 | 3/2005 | Chimel et al. |
| 2005/0084588 A1 | 4/2005 | Shukla et al. |
| 2005/0095350 A1 | 5/2005 | Barresi et al. |
| 2005/0118323 A1 | 6/2005 | Sault et al. |
| 2005/0136174 A1 | 6/2005 | Korolchuk et al. |
| 2005/0181019 A1 | 8/2005 | Palmer et al. |
| 2005/0238694 A1 | 10/2005 | Gerhardt et al. |

FOREIGN PATENT DOCUMENTS

| | | |
|---|---|---|
| WO | WO-00/56172 A | 9/2000 |
| WO | WO-01/64044 A2 | 9/2001 |
| WO | WO-2004/112491 A2 | 12/2004 |

* cited by examiner

FIG. 5

| Base: Total Respondents | Total | | Chocolate Caramel Crisp 1st Position | |
|---|---|---|---|---|
| | 2A | 2B | 2A | 2B |
| | 153 | 153 | 75 | 78 |
| Factors | | | | |
| Grams Saturated Fat | 3.0 | 2.5 | 3.0 | 2.5 |
| | | | | |
| *Overall Preference %* | *63s* | *37* | | |
| *Overall Liking* | | | | |
| Mean | 7.29s | 6.33 | 7.39 | 7.13 |
| | | | | |
| Expectations | | | | |
| Much Better Than Expected % | 38s | 23 | 44 | 33 |
| Much/Somewhat Better Than Expected % | 63s | 46 | 68 | 56 |
| Expectations of a Chocolate Flavored Nutrition/Energy Bar | | | | |
| Much Better Than Expected % | 34s | 24 | 37 | 32 |
| Much/Somewhat Better Than Expected % | 59s | 44 | 67 | 55 |

Italicized Measure(s) indicate Action Standards
Overall Liking and Liking Ratings: 9 point scale – 9=Like It Extremely to 1=Dislike It Extremely

FIG. 6

| Base: Total Respondents | Chocolate Caramel Crisp | | | | |
|---|---|---|---|---|---|
| | Total | | 1st Position | | |
| | 2A | 2B | 2A | 2B | |
| | 153 | 153 | 75 | 78 | |
| Factors | | | | | |
| Grams Saturated Fat | 3.0 | 2.5 | 3.0 | 2.5 | |
| | | | | | |
| Overall Appearance Liking* (Mean 9=Like It Extremely to 1=Dislike It Extremely) | 7.36* | 7.45* | 7.58* | 7.69* | |
| Appearance Intensity* (Mean 9=Very Appetizing to 1=Not At All Appetizing) | 6.94* | 7.22* | 7.24* | 7.40* | |
| Overall Aroma Liking (Mean 9=Like It Extremely to 1=Dislike It Extremely) | 7.22s | 6.76 | 7.49 | 7.23 | |
| Aroma Intensity (Mean 9=Very Strong to 1=Very Weak) | 6.33 | 6.33 | 6.65 | 6.27 | |

*Base: Undamaged bars

FIG. 7

| | Chocolate Caramel Crisp | | | |
|---|---|---|---|---|
| | Total | | 1st Position | |
| | 2A | 2B | 2A | 2B |
| Base: Total Respondents | 153 | 153 | 75 | 78 |
| Factors | | | | |
| Grams Saturated Fat | 3.0 | 2.5 | 3.0 | 2.5 |
| | | | | |
| Overall Taste Liking (Mean 9=Like It Extremely to 1=Dislike It Extremely) | 7.24s | 5.99 | 7.47s | 6.71 |
| Overall Taste Intensity (Mean 9=Very Strong to 1=Very Weak) | 6.63d | 6.29 | 6.85d | 6.35 |
| Chocolate Flavor Liking (Mean 9=Like It Extremely to 1=Dislike It Extremely) | 7.24s | 6.20 | 7.43s | 6.79 |
| Chocolate Flavor Intensity (Mean 9=Very Strong to 1=Very Weak) | 6.21 | 5.98 | 6.37 | 6.22 |
| Taste of The Coating Liking (Mean 9=Like It Extremely to 1=Dislike It Extremely) | 7.01s | 6.33 | 7.21 | 6.91 |
| Caramel Flavor Liking (Mean 9=Like It Extremely to 1=Dislike It Extremely) | 7.14s | 6.33 | 7.25 | 7.12 |
| Caramel Flavor Intensity (Mean 9=Very Strong to 1=Very Weak) | 6.22d | 5.80 | 6.33 | 6.14 |
| Overall Sweetness Liking (Mean 9=Like It Extremely to 1=Dislike It Extremely) | 7.02s | 6.15 | 7.20 | 6.86 |
| Overall Sweetness Intensity (Mean 9=Very Sweet to 1=Not At All Sweet) | 6.24s | 5.70 | 6.49s | 5.87 |
| Caramel Sweetness Liking (Mean 9=Like It Extremely to 1=Dislike It Extremely) | 7.10s | 6.29 | 7.24 | 7.09 |
| Caramel Sweetness Intensity (Mean 9=Very Sweet to 1=Not At All Sweet) | 6.30d | 5.86 | 6.45 | 6.15 |
| Noticed An Aftertaste % | 38 | 50s | 40 | 45 |
| Pleasantness of Aftertaste* | | | | |
| Pleasant | 34s | 17 | 37 | 26 |
| Neither Pleasant Nor Unpleasant | 29 | 32 | 33 | 40 |
| Unpleasant | 36 | 51d | 30 | 34 |

*Base: Has An Aftertaste Total: 2A (58), 2B (76); 1st Position: 2A (30), 2B (35)

FIG. 8

| | Chocolate Caramel Crisp | | | |
|---|---|---|---|---|
| | Total | | 1st Position | |
| | 2A | 2B | 2A | 2B |
| Base: Total Respondents | 153 | 153 | 75 | 78 |
| Factors | | | | |
| Grams Saturated Fat | 3.0 | 2.5 | 3.0 | 2.5 |
| Overall Texture Liking (Mean 9=Like It Extremely to 1=Dislike It Extremely) | 6.97s | 6.37 | 7.21 | 6.96 |
| Caramel Texture Liking (Mean 9=Like It Extremely to 1=Dislike It Extremely) | 7.06s | 6.35 | 7.23 | 7.04 |
| Moistness Intensity (Mean 9=Very Moist to 1=Not At All Moist) | 6.29 | 6.08 | 6.59 | 6.19 |
| Firmness Intensity (Mean 9=Very Firm to 1=Very Soft) | 7.01 | 6.84 | 7.03 | 7.06 |
| Chewiness Intensity (Mean 9=Very Chewy to 1=Not At All Chewy) | 6.76 | 6.79 | 6.91 | 6.95 |
| Crispiness Intensity (Mean 9=Very Crispy to 1=Not At All Crispy) | 6.96 | 6.81 | 7.20 | 7.12 |

LOW-CALORIE FOOD BAR

FIELD OF THE INVENTION

This invention relates to food bars, and particularly low-calorie nutrition energy snack bars and components thereof.

Low calorie triple layer nutrition energy snack bars are typically made with a protein powder core held together with binder syrup containing a large fraction of sugar alcohols (i.e. glycerin, maltitol, sorbitol, erythritol, etc.). The triple layer snack bars, in one known configuration, contain a dense core layer, a caramel layer, and a compound coating which enrobes them. A blend of vitamins and minerals are also often formulated into these bars. A significant disadvantage with these conventional snack bars is that they are typically must be sized smaller in weight and volume for any targeted maximum caloric content due to their high sugar and sugar alcohol content. Some representative commercial snack bars on the market contain 20 g sugar alcohols per 55 g serving size. The core layers thereof in particular are often dense, non-porous, smoothly textured components containing high levels of sugars/sugar alcohols delivering non-optimal caloric loads. These bars often may have a sugar alcohol-based caramel layer enrobed with a chocolate compound coating that may also contain additional sugar alcohols. Also, significant loading levels of sugar alcohols in snack bar products may not be tolerated well by many consumers from standpoint of digestive comfort. There is need for improved food bars that offer quantity and organoleptic quality in a low-calorie handheld format.

SUMMARY

The present invention is directed to low-calorie nutrition energy food bars with high soluble fiber and reduced sugar alcohol contents, which have excellent flavor and multi-texture properties.

In one embodiment, the invention provides a food bar having less than 110 Cal/28 g serving which includes an core component comprising, as a unitary matrix, protein crisps, caramel, water-soluble dietary fiber, and a binder system; a caramel component which also contains water-soluble dietary fiber; and a compound coating applied to surface portions of the core component and caramel component. This basic food bar construction is occasionally referred to herein as a "triple layer" bar for convenience, although it will be appreciated that inclusion of additional flavoring components and/or layers in the food bar are also contemplated within embodiments of the present invention unless otherwise indicated. For purposes herein, caloric content of food bars described herein are determined by consideration of the calorie contribution of all the individual ingredients of the food product.

In a particular embodiment, the caramel and water-soluble dietary fiber ingredients are introduced into the core component as a premix referred to herein as a high fiber caramel composition. The caramel is used as a carrier for introducing the water-soluble fiber into the core component. Unless otherwise indicated, "high fiber" is shorthand herein for "high water-soluble dietary fiber The high fiber caramel composition may have a similar fiber content as the high fiber caramel component, or they may be adjusted independent of one another to customize the fiber content of the different components of the food far. Also in this particular embodiment, a separate quantity of soluble fiber is directly added to the core component formulation, occasionally referred to herein as the core component "dough," in addition to the high fiber caramel composition contribution, as another source of soluble fiber in the core component. The compound coating also may be formulated with water-soluble fibers to provide a high fiber compound coating. In a particular embodiment, a portion of the high fiber compound coating may also be used as an ingredient of, and source of fiber for, the core component. This embodiment provides a third available source of soluble fiber in the core component, in addition to that introduced into the core via free fiber addition and high fiber caramel composition. Undue formulation thickening and processing problems which may arise from overly concentrating fiber content are avoided in embodiments of the present invention by distributing water-soluble fiber content in multiple components, compositions and layers of the food bars of the present invention. Moreover, this can be accomplished without sacrificing desirable flavor and texture in any given component/layer of the food bar as a whole.

It unexpectedly has been discovered that a low-calorie food bar can be prepared with a protein crisp core component that is cohesive, flavorful and crunchy, yet sufficiently soft/moist to be chewable, throughout the product's shelf life. The terms "core" and "core component" are used interchangeably herein. The introduction of significant amounts of water-soluble dietary fibers in the core component and the caramel component, in particular, and optionally also with the compound coating, makes it possible to produce a nutrition energy snack bar of desirable weight and volume having pleasing sensory properties with reduced use of high calorie ingredients such as sugars and sugar alcohols in particular.

The component layers incorporating the water-soluble dietary fiber as described herein aids in providing good moisture retention within the respective high fiber component layer, and between separate layers or components of the food bar, during the product's shelf life. This is an improvement over prior triple-layer snack bar products which have hardened over time unless significant amounts of conventional humectants like sugar alcohols are introduced. The addition of water-soluble fiber in the core component and other components of the food bar layer, effectively in place of higher calorie ingredients, such as sugar and sugar alcohols, makes it possible achieve a total caloric content of less than 110 calories per 28 g serving size bar. Moreover, the food bar has excellent flavor and texture properties throughout even though it contains reduced sugar and sugar alcohol content. In particular it contains less than about 20 wt %, and particularly less than about 15 wt % total sugar alcohol content in any given component and the bar as a whole. In a particular embodiment, a 28 g serving size bar contains less than about 4 g total sugar alcohols, and particularly contains a total sugar alcohol content ranging from about 2 g to about 4 g, or less.

In one embodiment, the core component may comprise about 10 wt % to about 18 wt %, particularly about 12 wt % to about 16 wt %, and more particularly about 13 wt % to about 15 wt %, total water-soluble dietary fibers. The high fiber caramel composition and high fiber caramel component may comprise about 20 wt % to about 60 wt %, particularly about 23 wt % to about 32 wt %, and more particularly about 25 wt % to about 30 wt %, water-soluble dietary fibers. The compound coating layer, if formulated with soluble fiber, may comprise about 20 wt % to about 35 wt %, particularly about 23 wt % to about 32 wt %, and more particularly about 25 wt % to about 30 wt %, water-soluble dietary fibers. The food bar, as a whole, comprises about 5 wt % to about 30 wt %, particularly about 12 wt % to about 24 wt %, and more particularly about 17 wt % to about 19 wt %, total water-soluble dietary fiber.

Especially useful water-soluble dietary fibers in the practice of embodiments of the present invention comprise fructooligosaccharides ("FOS"), e.g., inulin. These soluble fibers have approximately 1 cal/g, which is much less than conventional confectionery sugars and sugar alcohols. Other low degree of polymerization (DP=2–10) soluble fibers, such hydrolyzed gums, also may be used. The water-soluble dietary fibers may be selected, for example, from the group consisting of oligosaccharides, psyllium, beta glucan, oat bran, oat groat, pectin, carrageenan, guar, locust bean gum, gum acacia, and xanthan gum, and the like or combinations thereof.

The caramel ingredient not only may be used as a carrier for the water-soluble fiber introduced into the core component, it also imparts desirable cohesion, lubricity, and texture in the core component, as well a mild sweet flavor compatible with other flavors (e.g., vanilla, peanut butter, chocolate) used in the bar. Caramel with varying levels of firmness can be used to modify the firmness of the protein crisp-based core. Addition of caramel (e.g., approximately 86-88% solids) improves initial bar cohesion, moistness, and palatability in particular when compared to bars produced without caramel in the core's binder system. As indicated, soluble fiber also is incorporated into the food bar via the separate caramel component to aid that component in moistness retention and so forth, effective to reduce sugar alcohol requirements and so forth, and thus further reduce calories in the food bar.

As indicated, the core component formulation also optionally may include a portion of the (high fiber) compound coating, otherwise formulated and used for enrobing the bar. The compound coating also aids in maintaining moistness of the core component during shelf life. It also is thought to act as an internal moisture barrier inhibiting moisture migration from binder system to the protein crisps. By using these core component formulation manipulations, the core component is maintained flavorful and crunchy in texture for commercial shelf life periods.

The calorie range for the "triple layer" food bars of the present invention can be easily formulated to between 90-110 Cal/28 g serving, or other caloric target ranges as desired or specified. The food bar may be formulated to deliver, per 28 g serving, at least about 5 g protein, particularly at least about 7 g protein, and at least about 5 g dietary fiber, particularly at least about 7 g dietary fiber. It also may be formulated to provide an excellent source of calcium and essential vitamins, minerals, nutraceuticals, etc., in a snack sized (e.g., 28 g) bar. Also, the finished low-calorie, high soluble fiber content food bar has a water activity ($A_w$) of less than about 0.60, particularly ranges from between about 0.40 and about 0.60, or higher values with use of preservatives and/or antimicrobial additives. Thus, the food bar has water activity properties conducive for controlling microbial activity, and, in turn, maintaining shelf life. The food bar generally has a shelf life of at least about six months, and may exceed nine months.

Although illustrated herein as a component of a triple layer bar, the core component also represents unique low-calorie food composition with limited sugar alcohol content, which can be used alone as a food product itself, or in combination with other edible food components in a variety of composite food products, especially confection and snack products. The present invention also relates to methods of making the food bar and components thereof.

BRIEF DESCRIPTION OF THE DRAWINGS

FIG. 5 is a table reporting overall taste test results for a chocolate caramel triple-layer bar in accordance with an embodiment of the present invention.

FIG. 6 is a table reporting appearance and aroma test results for a chocolate caramel triple-layer bar in accordance with an embodiment of the present invention.

FIG. 7 is a table reporting flavor liking and intensity test results for a chocolate caramel triple-layer bar in accordance with an embodiment of the present invention.

FIG. 8 is a table reporting texture liking and intensity test results for a chocolate caramel triple-layer bar in accordance with an embodiment of the present invention.

DETAILED DESCRIPTION OF THE INVENTION

Figure 1:
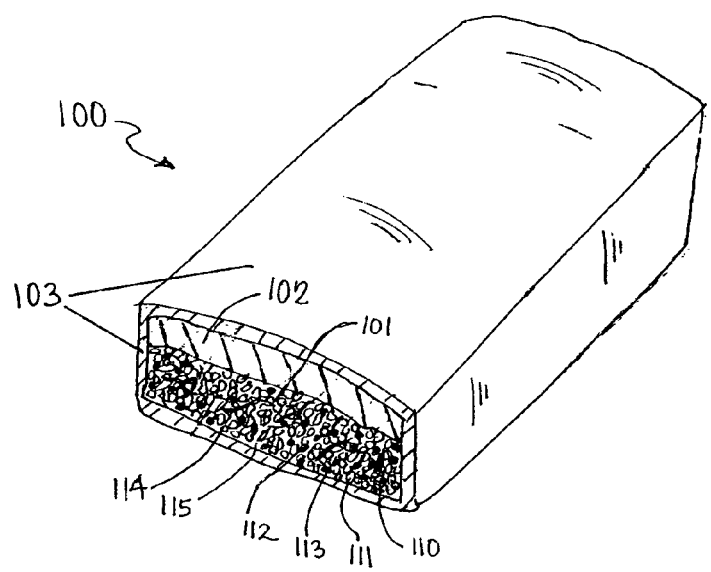
FIG. 1 is a perspective view in partial cross-section of a food bar according to one embodiment of the present invention.

Referring to FIG. 1, a low-calorie nutritional energy snack bar 100 is shown accordance with one embodiment of the present invention. A core component 101 is stacked under a high fiber caramel component 102, and the resulting combination is enrobed with a compound coating 103. Core component 101 contains, as a unitary matrix 110, protein crisps 111, a binder system 112, caramel 113, and water-soluble dietary fiber 114. The matrix 110 is a porous structure, and includes air gaps or interstices 115. These important constituents of these bar components are described in more detail below.

Figure 2:
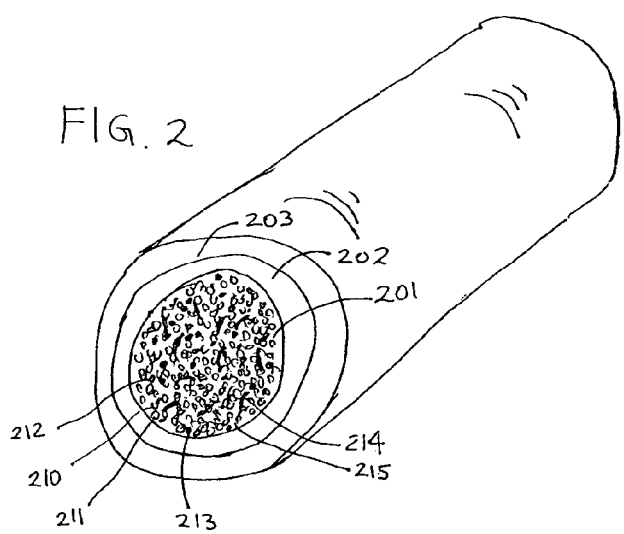
FIG. 2 is a perspective view in partial cross-section of a food bar according to another embodiment of the present invention.
Figure 3:
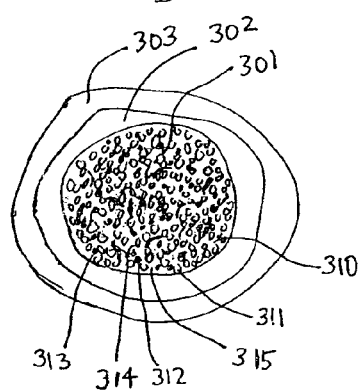
FIG. 3 is a cross-sectional view of a snack product according to another embodiment of the present invention.

Also, it will be appreciated that the sizes and shapes of the components as shown in FIG. 1, and FIGS. 2-3 discussed below, are not necessarily drawn to scale or shape, nor are they intended to reflect actual distributions of the various components of the core component 101 in particular. For example, in the core component 101, the caramel and water-soluble fibers may be dispersed throughout the matrix via the binder system. Some portion of the water-soluble dietary fiber content also may be dispersed directly in the binder system 112 or added freely to the core component dough formulation. Also, the binder system and caramel generally coats at least in part, or intermittently spot contacts, surface portions of the protein crisps 111 as a thin coating layer and/or as discrete particles throughout the matrix 110.

Although illustrated as a horizontal layered construction in slab form in FIG. 1, it also will be appreciated that the concepts of the present invention can be implemented in a wide variety of layering orientations and geometrical shapes and forms which incorporate the above-indicated three components. For convenience, the food bar may be shaped into any form convenient for packaging, handling and grasping. The food product can be eaten out of the package by hand without need for dining utensils. The bar shapes and forms include, for example, slab, cylinder, sphere, and the like. The core component 101 is not limited to a sheet construction, nor is the bar 100 limited to a generally rectangular slab construction, as illustrated in FIG. 1. For example, the core component also may be formed in a cylindrical or other non-planar rectilinear geometric shape (FIG. 2), or generally as a sphere-like shape (FIG. 3), which is used as a core component thereof that is encapsulated with the caramel coating, and the resulting intermediate composite structure in turn is enrobed with compound coating. In this regard, components 201 to 203, 210 to 215 in FIG. 2 and components 301 to 303, 310 to 315 in FIG. 3 correspond respectively to components 101 to 103, 110 to 115 of FIG. 1.

It has been discovered that significant quantities of water-soluble dietary fibers can be incorporated into the food bar as a whole via distribution thereof in the core component, high fiber caramel composition, and/or other coatings, constituents and ingredients of the food bar, as described herein to provide a less dense structure of lower caloric content for a given volume than conventional cores made with significant amounts of sugars and sugar alcohols. Moreover, this caloric reduction is achieved without diminishing product flavor and texture. Moistness retention is provided in significant part by the water-soluble fiber content in combination with non-fibrous portions of the high fiber caramel composition and any compound coating composition used as ingredients in the core component, reducing the need for sugar alcohols and similar humectants. Instead of a dense smooth core region, a lighter organoleptically-pleasing crunchy core region is provided in food bars of the present invention. Additional exemplary details on the food bar components, layers, compositions, and ingredients are provided below.

Core Component.

The core component of the food bar includes protein crisps, caramel, water-soluble dietary fibers, and a binder system. Compound coating also may be included in the core component. These and any other ingredients are combined in the form of a light, crunchy, cohesive, porous matrix. It optionally also may include a portion of the (high fiber) compound coating.

The core component may comprise, from all ingredients and sources, about 10 wt % to about 18 wt %, particularly about 12 wt % to about 16 wt %, and more particularly about 13 wt % to about 15 wt %, total water-soluble dietary fibers. In one particular embodiment, a high fiber caramel composition is used as a source of both soluble fiber and caramel for the core dough formulation. The high fiber caramel composition and the high fiber caramel component independently may comprise about 20 wt % to about 60 wt %, particularly about 23 wt % to about 32 wt %, and more particularly about 25 wt % to about 30 wt %, water-soluble dietary fibers. For a high fiber caramel composition containing about 25-30 wt % soluble fiber, for example, it generally is added to the core component in a range amount of about 5 wt % to about 20 wt %, particularly about 5 wt % to about 15 wt %, and more particularly about 5 wt % to about 10 wt %. It has a pure caramel content constituted by its non-fibrous portion.

As another source of soluble fiber for the core component, a portion of the compound coating used to enrobe or otherwise coat the food bar's interior components can be formulated with soluble fiber as an ingredient, which in part is added to the core dough. The compound coating layer, if formulated with soluble fiber, may comprise about 20 wt % to about 35 wt %, particularly about 23 wt % to about 32 wt %, and more particularly about 20 wt % to about 30 wt %, water-soluble dietary fibers. For a high fiber compound coating containing about 25-30 wt % soluble fiber, for example, it generally is added to the core component in a range amount of about 5 wt % to about 20 wt %, particularly about 5 wt % to about 15 wt %, and more particularly about 5 wt % to about 12 wt %.

As a separate source of soluble fiber in the core component, it also may be directly added to the core component during dough making. For example, soluble fiber also can be added to the core component in dry particulate form (e.g., powder form). This aids in relieving the level of fiber loading required in the high fiber caramel composition used as a core ingredient, the high fiber caramel component, and any high fiber compound coating used in the food bar and its individual components and layers. Generally, the level of direct addition of soluble fiber in particulate form to the core dough should be monitored and limited to avoid causing undue thickening of the core dough, such that it becomes difficult to process. In one embodiment, the amount of soluble fiber directly added to the core dough formulation ranges from about 5 wt % to about 15 wt %, particularly about 5 wt % to about 10 wt %, and more particularly about 7 wt % to about 9 wt %, based on total core component weight (dry basis).

The protein crisps ingredient of the core component may be added in a range amount of about 20 wt % to about 80 wt %, particularly about 30 wt % to about 50 wt %, and more particularly about 35 wt % to about 45 wt %.

The binder system may be contained in the core component in a general range amount of about 10 wt % to about 30 wt %, particularly about 12 wt % to about 24 wt %, and more particularly about 16 wt % to about 20 wt %, based on total binder amount therein.

The thickness of the core component can vary depending on its shape and the overall food bar product size, and the amount of sensory contribution desired from this component in a particular food bar, among other considerations. For example, for a horizontal layered construction of a food bar having a size of about 28 g, the core component may have a generally planar layer construction of approximately uniform thickness of about 0.25 to about 0.75 inch, particularly about 0.5 inch. The core component is porous, i.e., it includes continuous or discontinuous air pockets. The density of finished core component is generally about 0.4 to about 0.8 g/cm$^3$, particularly about 0.5 to about 0.7 g/cm$^3$.

Other additives and ingredients also may be included in the core component. Confectionary flavorings may be included in the core component, such as peanut butter flavor, vanilla flavoring, chocolate flavoring, and the like and combinations thereof. The core component also may include processing aids such as those commonly used in the confectionary arts. Soy lecithin can be included to adjust the fluidity of the core component dough to a desirable level. Vegetable oils and/or shortenings also can be included in the core component dough as secondary binders and/or film formers. Additional flavorings, seasonings, colorants, inclusions, preservatives, antioxidants, excipients, and the like and combinations thereof also may be included therein in minor amounts. Illustrations of these processing aids and other optional additives, which also may be used in the caramel component, compound coating or other components of the food bar, are described in greater detail below.

Water-Soluble Dietary Fibers.

The water-soluble dietary fibers are used in place of higher calorie conventional food bar ingredients, and particularly, sugars and sugar alcohols, in components of the food bar of the present invention. It has been found that the use level of conventional confection humectants in particular, and particularly, sugar alcohols, can be reduced significantly by their replacement with soluble fiber content without diminishing organoleptic properties of the finished product.

For purposes herein, "water soluble dietary fiber," or "soluble fiber" for short, means dietary fiber which is water soluble or water swellable. "Dietary fiber" is commonly understood to mean the fibrous or gummy component of food which is non-digestible and non-metabolizable by humans. Chemically, fiber is the remnant of plant cell walls, lignin, polysaccharides and similar substances that resist hydrolysis in the human digestive tract.

Water soluble dietary fibers include, for example, oligosaccharides, psyllium, beta glucan, oat bran, oat groat, pectin, carrageenan, guar, locust bean gum, gum acacia, and xanthan gum, and the like and combinations thereof.

Oligosaccharides are understood to comprise any saccharide containing at least two and up to 20 monosaccharide units, whether of starch (alpha-glucan) or non-starch type. Examples of oligosaccharides include fructo- and galacto-oligosaccharides, such as hydrolyzed inulin and levan (fructans), and short-chain amylodextrins and the like. The oligosaccharides are usually soluble and largely fermentable. Especially preferred are oligosaccharides having an average chain length (degree of polymerization) of between 3 and 9 monosaccharide units. Preferably, the fiber composition according to the invention consists of 8-40 wt. %, more preferably of 12-30 wt. % of oligosaccharides, especially inulin and hydrolyzed inulin, or a derivative thereof. Since native inulin usually consists of a mixture of polyfructoses of varying chain length, both under and over 20 monosaccharide units, it also can contribute to the oligosaccharides as defined above, depending on its specific composition.

Fructo-oligosaccharides ("FOS") are particularly useful in the present invention. Inulin and oligofructose are natural components of plants such as leek, chicory, onions and garlic. Inulin is a beta-2,1 fructan with the basic structure $Gf_n$, where G=glucosyl unit; f=fructosyl unit; and n=number of units linked. The DP (degree of polymerization) of inulin is primarily 2 to 60, with over half of the dry weight at a DP less than 20. Oligofructoses, or FOS, are a mixture of beta-2,1 fructans with the same structure noted for inulin. However, the DP ranges from 2 to 20, with the primary weight as 2 to 8. Inulin is generally available commercially as an extract of chicory root. Commercial sources of inulin and useful derivatives thereof include, for example, Raftilose® (hydrolyzed inulin), 19.1 wt. % of Raftiline® (inulin), manufactured by ORAFTI. These products are commercially available in powder forms, although not limited thereto.

Inulin and FOS have a number of desirable nutritional properties. They are low in calories, viz., about 1 cal/g for inulin, slightly higher for FOS. They are also suitable for diabetics since they don't result in an increase in blood glucose. Inulin and FOS are reported to stimulate the growth of bifidobacteria in the GI tract, inhibiting the growth of harmful bacteria and positively affecting the immune system. Other reported benefits include aiding better resorption of minerals, production of nutrients and prevention of constipation. As dietary fiber, they reportedly decrease fecal transit time, reduce glycemic response, lower blood cholesterol, and increase stool weight.

High Fiber Caramel Composition and High Fiber Caramel Component.

Caramel composition containing soluble fiber is used as a high fiber caramel composition ingredient of the core component, and separately as the primary or sole ingredient used in forming a separate high fiber caramel component that is layered with the core component during manufacture of the food bar. Useful water-soluble fibers are similar to those described above. In one particular embodiment, both the high fiber caramel compositions used as core ingredient and that used in making the high fiber caramel component generally share a common formulation comprising caramel and water-soluble dietary fiber. The high fiber caramel composition and high fiber caramel component can be conveniently prepared from a common batch formulation, with a portion thereof used as an ingredient of the core component and the remainder for manufacture of the core component, although this is not required. Thus, in one embodiment, the high fiber caramel composition and high fiber caramel component contain similar soluble fiber content thereof, which can be the range amounts thereof as described above for the high fiber caramel composition under the discussion of the core component Even if initially prepared from a single master batch, it is also possible to subsequently adjust (typically via increase) the fiber levels of one or the other caramel constituents before their incorporation into the food bar during its assembly, or they can be kept the same. The non-fibrous balance of the caramel formulation typically is composed of pure caramel or is substantially pure caramel. As indicated, a minor portion is of the high fiber caramel composition (batch) is separated for separate use as a high fiber caramel composition ingredient for the core component. The remaining major portion of the batch can be used in forming the caramel component in the food bar.

The caramel portion of the high fiber caramel formulations may comprise conventional caramel or similar confectionary material. For example, the caramel is comprised predominantly of a caramelized premix of carbohydrate and fat sources. Caramel may be made by mixing at least one fat source and at least one carbohydrate source to create a caramel premix. A particular caramel premix composition comprises from about 5 wt. % to about 15 wt. % of vegetable fat, more preferably, from about 7 wt. % to about 14 wt. %, and most preferably, from about 10 wt. % to about 13 wt. % of vegetable fat in the caramel premix. A preferred carbohydrate for the caramel premix is corn syrup. The corn syrup in the caramel premix is preferably present in a range of about 25 wt. % to about 60 wt. %, more preferably, from about 35 wt. % to about 50 wt. %, and most preferably, from about 40 wt. % to about 48 wt. % of corn syrup in the caramel premix. The caramel used for such applications particularly may be made from corn syrup, skim milk, sugar, partially hydrogenated cottonseed and palm oils, butter, milk protein, salt and emulsifiers. The soluble fiber content is added and mixed with the caramel premix.

In one embodiment, the fiber-caramel mixture is then cooked using any suitable means, e.g., using a scraped surface heat exchanger or jacketed mixing kettle, to form a fiber-caramel composition having a viscosity ranging from about 700,000 to about 1,600,000 cps, a moisture content of about 7 wt. % to about 15 wt. %, more particularly about 10 wt. % to about 13 wt. %, most particularly about 11 wt. % to about 12 wt. %, and a water activity of about 0.45 to about 0.65, more particularly about 0.5 to about 0.6, most particularly about 0.51 to about 0.58. As with conventional caramel preparation, the actual cooking time used affects the flavor, color, and texture of the caramel, and it is accordingly monitored and adjusted as needed. The fiber content does not adversely impact caramel flavor and texture in the cooked mixture when used in accordance with embodiments of this invention. The high fiber caramel composition is cooled, such as to a temperature of less than about 65° C. In preparing the high fiber caramel component, the high fiber caramel composition is formed into a sheet or layer. Other portions of the high fiber caramel composition are not sheeted or layered, and instead can be directly used as an ingredient of the core component, and/or other ingredients or other layers of the food bar.

The addition level of the high fiber caramel composition into the core component is not particularly limited as long as sufficient soluble fiber is incorporated in the food bar to allow sugar alcohol addition rate reductions and the like. Also, the pure caramel portion of high fiber caramel composition also can be used to modify firmness of the core, impart lubricity, and impart mild sweet flavor compatible with other common confection flavorings.

Protein Crisps.

The core component includes crunchy high protein crisps that impart bulk volume with reduced density. In a particular embodiment, they comprise a crispy proteinaceous material in solid particulate form provided in the form of puffed or expanded, protein-rich dough materials having a bulk product density of no greater than about 3 g/cm$^3$.

A protein source useful for making dough for crisp production may be selected from, for example, one or more of plant, animal, or dairy protein sources, or edible derivatives thereof. In a particular embodiment, the protein source is selected from soy protein, peanut protein, wheat germ, whey protein, casein, caseinate, casein hydrolysate, egg protein, nut meats, and the like and combinations thereof. The protein crisps should be sufficiently dry to be crunchy, and not soft. The moisture content of the protein crisps generally is less than about 5 wt %, particularly less than about 4 wt %. The protein crisps may be heated prior to incorporation into the food bar to adjust the moisture content thereof.

Soy protein typically is extracted from soybean and is considered to be an economical protein source. The most popular types of soy protein are soy protein isolates and soy protein concentrates. Soy protein isolates are highly digestible and also a good source of amino acids and isoflavones. In addition, they are low in fat, calories, and cholesterol. For vegetarians, this is a primary source of protein. Deflavored protein products of soybeans also may be used and are commercially available. Other leguminous plant protein sources, such as peanut flour, also may be used. Dairy proteins obtained from milk and/or cheese also may be used. Whey protein is derived from whey, which is a by-product of cheese making. Functionally, whey proteins are highly soluble even under acidic conditions. There are primarily two forms of whey protein, whey protein isolate and whey protein concentrate. Both are extremely high quality proteins that are highly digestible. However, whey protein isolate is somewhat superior because it is higher in protein and has lower fat, lactose, and flavor levels than whey protein concentrate. Casein is the primary protein found in milk protein, which comprises about 80% casein and about 20% whey protein. Casein includes caseinates, which are available in three main types, sodium, calcium, and potassium. Egg proteins, such as spray dried egg white powders also may be used.

In a particular embodiment, the crispy proteinaceous material comprises soy crisps. In one particular embodiment, the soy crisps contain at least 50 wt %, particularly at least about 60 wt %, soy content, and have a bulk density of about 0.2 to about 0.26 g/cm$^3$, and a particle size distribution of at least 60 wt % on (+) #6 Mesh screen (3.36 mm sieve opening). Soy crisps may be prepared from a dough made with a soy protein source which is introduced into an extruder, and from which the extrudate is die cut into pellet form and dried to form small expanded or puffed pieces or nuggets of soy material. Commercial sources of useful soy crisps include, for example, soy nuggets (e.g., product no. H0311) from Solae Company, Saint Louis Mo., which are crispy, crunchy crisps indicated to contain 60-80% protein content.

Binder System.

The term "binder," when used without qualification herein generally refers to a carbohydrate syrup composition or other confectionary binding composition that can be rendered flowable that essentially acts as a "glue" for combining the dries, that is, the relatively dry ingredients of the core component, or other food component under discussion herein.

The binder particularly may comprise carbohydrate based syrup, such as a sugar syrup. Carbohydrate based syrups include, but are not limited to rice syrups, corn syrups, liquid sucrose, honey, high fructose corn syrup, and mixtures thereof. Sugar syrups are particularly useful. In one embodiment, about 16 wt. % to about 20 wt. % of the total weight of the core component of the bar, may be made up of carbohydrate based syrup as the primary or essentially sole binder material. Other binding materials may include gelatin, hydrolyzed collagen, egg solids, and the like and combinations thereof. The syrup composition also may be a gelatin matrix comprised of gelatin, water, fat, syrup and sugars. When mixed with other ingredients, such as soy products, the binder can also be a source of protein.

A binder can also be used as a medium for admixture and a carrier for distributing additives throughout the core component matrix such as the high fiber caramel composition and any compound coating added thereto, as well as liquid- or soluble or liquid-dispersible food bar additives such as vitamins, minerals and macronutrients, flavorings and colorings, and so forth.

Compound Coating.

The compound coating typically comprises a fat source, and, optionally, also water-soluble dietary fiber content. In a particular embodiment, the compound coating comprises chocolate or milk chocolate. One or more flavorings, such as peanut butter, vanilla, and chocolate flavorings, and so forth and combinations thereof, also are usually included in the compound coating, although not required. The compound coating is applied to exposed surfaces of the assembled, e.g. stacked, core component and caramel component in a manner useful to completely or partially enrobe, encapsulate, cover and so forth, those components.

Fat Source.

The term "fat source" as used herein is synonymous with the term "lipid." Suitable sources of the fat source include vegetable, dairy, animal and/or marine fat sources. Useful herein are fats and oils that are conventionally used in food products, particularly confections. Fatty triglycerides such as oils and solid fats can be used herein as well as blends thereof. Particularly useful oils include, for example, nonhydrogenated and/or partially hydrogenated oils such as palm kernel oil, palm oil, canola oil, corn oil, safflower oil, soybean oil, coconut oil, cottonseed oil, and fractionated oils such as fractionated palm kernel oil. Oils having a melting point above room temperature generally are more convenient to process with. However, butter, shortening, or other solid fats at room temperature also may be used, but typically will require heating sufficient to make them flowable and dispersible during processing. As dairy fat sources, anhydrous milkfat, milk concentrate, or powdered milk may be used. The fat source also includes flavoring components such as chocolate, cocoa butter, and coconut, and the like and combinations thereof. Animal (e.g., lard, beef tallow) and marine (e.g., fish oil) fat sources are generally less desired, but also may be used. Partially digestible and non-digestible synthesized triglycerides or natural lipids also optionally may be used. The compound coating generally contains about 25 to about 38 wt %, particularly about 28 to about 34 wt % total fat source content.

The compound coating also may include binders, such as those previously described herein, flavoring materials (chocolate, cocoa powder, vanilla, etc.), stabilizers (e.g., lecithin), sweeteners (e.g., natural and/or artificial sugars), inclusions, and so forth. Other additives and processing aids commonly used in confectionary compound coatings also may be used.

As previously discussed, the compound coating may optionally include water-soluble dietary fiber. A high fiber compound coating composition useful as both an enrobing composition as well as being an ingredient of the core component dough formulation can be prepared by mixing compound coating and soluble fibers as a single batch formulation.

Food Bar.

The food bar of the present invention may be formulated to deliver, per 28 g serving, at least about 5 g protein, particularly at least about 7 g protein, and at least about 5 g dietary fiber, particularly at least about 7 g dietary fiber. In another particular embodiment, the food bar may be formulated such that the total saturated fat content of the food bar does not exceed about 3 g, particularly does not exceed about 2.5 g, per 28 g serving. The food bar, as a whole, comprises about 5 wt % to about 30 wt %, particularly about 12 wt % to about 24 wt %, and more particularly about 17 wt % to about 19 wt %, total water-soluble dietary fiber content. In particular the food bar contains less than about 20 wt %, and particularly less than about 15 wt % total sugar alcohol content in any given component and the bar as a whole. In a particular embodiment, a 28 g serving size bar contains less than about 4 g total sugar alcohols, and particularly contains a total sugar alcohol content ranging from about 2 g to about 4 g, or less. The finished food bars may have solids levels, for example, from about 75 wt. % to about 95 wt. %, particularly, from about 85 wt. % to about 92 wt. %, based on the total weight of the food bar. Moisture content and distribution throughout the finished food bar typically will substantially equilibrate within several days after production at room temperature.

Other Additives.

The core component, caramel composition and compound coating also may independently include other additives commonly used in the confectionary arts. Other additives can be included in the core component, caramel component, and/or compound coating to the extent they do not produce objectionable flavors, adversely impact the texture or water activity properties, or processability of the food bar, nor cause the total caloric level of the food bar to exceed predetermined limits.

Reduced amounts of sugar alcohols or other edible polyhydric alcohols may be used as secondary sweeteners and/or humectants in one more of the various food bar components or compositions to the extent they do not increase caloric content of the overall bar to values exceeding target values or prescribed limits. Sugar alcohols include, e.g., glycerin, erythritol, maltitol, sorbitol, and xylitol, and the like and combinations thereof.

The term "flavor" or "flavoring" as used herein refers to an organoleptic agent in the form of an emulsion, concentrate, aqueous- or oil-soluble liquid or a dry powder, as well as any type of chunky piece or pieces that may be added to a mixture at any time in the process. Flavorings can include nuts, nut pieces, fresh fruits, dried fruits, fruit products, seeds, candies, marshmallows, chocolates and chocolate products, and so forth. Flavorings further include any fruit flavors such as berry flavors, apple, cherry, plum, raisin, banana, pear, peach, figs, dates and so on. Flavorings may also include fats, salts, honeys, cheeses, frosting, powdered food products, sugar, sugar substitutes, gelatins and spices. Flavorings may also include colorings as well as any nut flavors as well as any sweet flavors such as chocolate, vanilla, peanut butter, caramel, butterscotch, lemon, malt, cinnamon, graham, coconut flavors, mint and so on. Flavorings additionally include any savory flavors such as all dairy, smoke, pepper, spicy and vegetable flavors.

Colorants include natural or uncertified colors from natural sources or certified colors for the effect of color. In one embodiment, the colors include dyes, certified aluminum lakes or colors derived from a natural source. Coloring agents may also be water-based or oil-based or dry. Coloring agents may be primary colors, blends of colors or discrete mixtures of colors, such as confetti.

The various components and layers of the food bar may include natural or artificial sweeteners to the extent they are not present in amounts that prevent conformance with caloric targets or limits set for the food bar. The sweetener may be one or more sugars. The term "sugar" as used herein refers to substantially all sugars and sugar substitutes, including any monosaccharide such as glucose or fructose, disaccharides such as lactose, sucrose or maltose, polysaccharides such as starch, oligosaccharide, sugar alcohols, or other carbohydrate forms such as gums that are starch based, vegetable based or seaweed based. The term "sweetener" as used herein refers to essentially all sweeteners that are "carbohydrate"-based, as defined herein and further includes sweeteners that are "non-nutritive" as defined above under "additive" above. Artificial sweeteners may be selected, for example, from aspartame, saccharin, sucralose, acesulfame K, and the like and combinations thereof.

Other edible additives include fortification components and the like. Vitamins, minerals, antioxidants, amino acids, essential oils, herbals, and polyphenols are non-limiting examples of the fortification component. The preferred vitamins are for example, vitamin A, vitamin C, vitamin D, vitamin E, vitamin K, and their derivatives and/or pro-vitamins. Preferred vitamins also include B vitamins such as, for example, biotin, folic acid, niacin, niacinamide, pantothenate, pyridoxine hydrochloride, riboflavin, thiamin hydrochloride, and the like. The minerals may include but are not limited to bromine, calcium, chromium, copper, iodine, iron, magnesium, manganese, phosphates, phosphorus, potassium, selenium, sodium, sulfur, and zinc. Amino acids include, for example, arginine, histidine, isoleucine, leucine, lysine, methionine, phenylalanine, threonine, tryptophan, valine, alanine, aspartic acid, glutamic acid, glutamine, glycine, serine, tyrosine, creatine, and the like. Moreover, phytochemicals, sterols, lycopine, herbal supplements such as ginseng, guarana, yerba mate, and the like may be included.

inclusions may be formulated to provide a crunchy textural feel. The inclusions have at least one physiologically functional component and may be, for example, fat-based inclusions, carbohydrate-based inclusions, protein based inclusions, and the like. The fat-based inclusions are characterized by having fat as the continuous phase. Non-limiting examples of fat-based inclusions include, chocolate, peanut butter, fat substitutes, and the like. Preferred fat-based inclusions are chocolate chips, peanut butter chips, and combinations thereof. Non-limiting examples include, whey protein, soy protein, milk protein, egg protein, peanut flour, nut meats, vegetable protein, casein, and combinations thereof. Examples of carbohydrate inclusions include, starch, sugar, gels, and combinations thereof. Moreover, the carbohydrate-based inclusions are preferably, panned inclusions, extruded gel pieces, friable carbohydrate pieces, sugar bits, extruded grain flour pieces and combinations thereof. The inclusions maybe, for example, agglomerates, capsules, compilations of ingredients, chunks, bits, drops, strands, strings, and the like. They may take on a variety of shapes, so long as the average particle size of the inclusions are from about 1 mm to about 13 mm. The preferred average particle size is from about 1 mm to about 6 mm. In addition, it is contemplated that the inclusions of the present invention may be different from one another. That is, it is not necessary that the inclusions be the same. For example, the food bar optionally may contain inclusions that are fat-based inclusions and inclusions that are carbohydrate-based inclusions.

Figure 4:
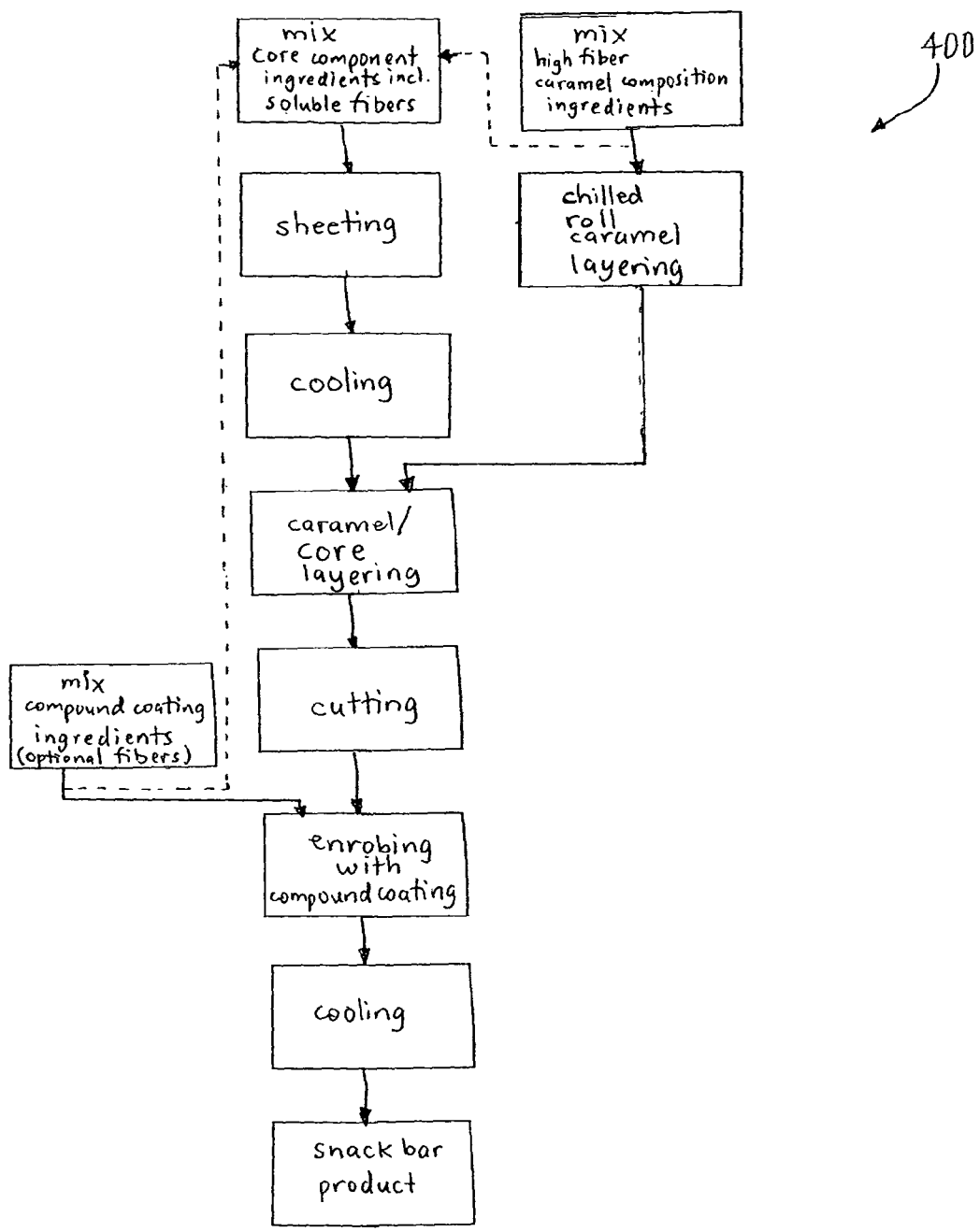
FIG. 4 provides a schematic flow diagram of a method for making the food bar of FIG. 1.

Methods and Equipment. Referring to FIG. 4, an exemplary non-limiting method 400 is shown for making a food bar in accordance with an embodiment of the present invention.

Numerous methods and apparatus may be used to mix or combine the various components and intermediaries used to construct the core component, caramel component, and compound coating. In general, so long as the mixing device is able to satisfactorily form a mixture that avoids high shear and imparts minimal heat energy, the mixer can be used. A sampling of such mixing devices includes but is not limited to, for example, mixing kettles and vessels, extruders, paddle mixers, ribbon blenders, mixing pans, processors, Z-blade mixers, dough mixers, planetary mixers, and the like can all be used.

Various snack bar assembly methods and apparatus may be employed to form the food bar. For example, the core component may be formed by preparing a mixture of its ingredient which is then formed into a sheet. In a particular embodiment, the sheet is formed via compression. The compression can be applied by spreading the premixed component core ingredients onto a leveled surface and applying compression from above. Any convenient suitable compression means can be used in this respect, such as by a mold, pressure platens, a compression roll or rollers, or a conveyor belt. The compression treatment will increase the density of the core component, such as to the previously indicated range values. The sheeting may be forming using compression rollers operated to create nip pressures effective for deforming the core component mixture into a substantially uniform thickness layer without significantly crushing the soy piece components thereof. Commercial bar making equipment may be used in this regard, such as Sollich bar making equipment. Individual core component pieces also may be made by employing a molding operation. A forming roll also may be used to create discrete core component pieces. An extruder also may be used to extrude the core component through a shaped die. The core component sheet is cooled. The core component sheeting, and separate caramel sheeting, may be cooled to solidify its shape or to prepare the component for the next unit operation. Typically, cooling is performed in an enclosed chamber, such as a cooling tunnel.

The caramel coating is prepared in a separate mixer. In one embodiment, it also is sheeted, which may done in a single operation with a chilled roller, or other arrangements used in the confectionary arts for forming caramel layers. The core component is then assembled, i.e., stacked, with the caramel component, and the resulting assembly is cut into bar shapes. One method that may be used to cut the core component/caramel component multi-sheeting assembly into a discrete pieces using a cutting apparatus, for example, a slitter, guillotine, wire cutter, forming roll, extruder, stamper, molder, and the like can be used.

The cut discrete pieces of core component/caramel component assembly, are then enrobed or otherwise receive the compound coating which forms a complete or partial covering on surface portions thereof, followed by additional cooling. These series of processing steps generally can be implemented by adaption of conventional confectionary processing techniques and equipment. The application of the compound coating may be provided in any convenient manner, such as via enrobing, drizzling, panning, extruding, spraying, depositing, and any other suitable technique may be used for applying the flowable compound coating material.

Optionally, additional processing steps may be incorporated. For example, the solid components may be treated to a roasting step to develop or impart flavor notes. This is particularly true when granola, grains, nuts, or soy crisps are used in the formulation. Roasting is performed in an oven such as a convection oven, a forced air impingement oven, dielectric oven, microwave oven, radiant oven, and the like. The temperature and time in the oven is largely dependent upon the component being treated.

Packaging.

The food bars can be packaged in any suitable manner. In one embodiment, the bars are individually wrapped such as in conventional flexible metallized film or foil known in the art and used for this general purpose. The individually wrapped food bars can be packaged in a secondary container, or a plurality of wrapped bars can be packaged in a common secondary container or carton or bag.

Unless otherwise noted, all percentages given herein are weight percentages. The following examples are provided to illustrate the invention and not limit it.

EXAMPLES

Example 1

Sensory tests were performed comparing a triple-layer bar construction representative of an embodiment of the present invention with a leading commercial snack bar product and also comparison bars having a conventional drizzled cereal-bar type format. Panelists examined the test bars from standpoints of flavor, texture, and visual appearance. They commented and rated the overall taste and texture of the test products in comparison to each other.

The commercial bar product used was a Powerbar Pria® chocolate peanut crunch bar, distributed by Powerbar, Inc., of Berkeley, Calif. The drizzled cereal-bar format products used were peanut butter flavor bars, where one had a peanut butter drizzle coating and the other a chocolate drizzle coating, and their cores comprised soy crisps bound into a compressed matrix with a binder system. The binder system used in the cereal bars was similar to that used in the triple-layer bar format, which is described below.

The triple-layer food bar representing an embodiment of the present invention had the following bench top formulation. The ingredients were: % Dries: Soy protein crisps (Solae Co., Saint Louis, Mo., 80% protein): 19.74%, vitamin and mineral blend: 0.30%, Binder Brown Rice Syrup: 8.00%, Caramel: 4.57%, soluble dietary fiber (Raftilose® P-95 powder): 2.000%, Acid Casein: 1.95%, Maltitol Syrup: 2.30%, Glycerin (USP 99.7%): 1.51%, Chocolate Liquor: 0.50%, Cocoa Powder: 1.000%, Crystalline Fructose: 0.91%, Soy Lecithin: 0.17%, Salt: 0.50%, tricalcium phosphate (TCP): 1.50%, Chocolate Flavor: 1.550%, Vanilla Flavor: 0.90%, Core component Caramel: 31.22%, Compound Coating Chocolate: 21.43%, total=100.0%.

The triple-layer food bar was manufactured according to the following general process. Process step 1: Mixed dries, including the fiber powder, to distribute vitamin mix, step 2: Mixed liquid components of binder syrup, and a premixed fiber caramel composition (30% soluble dietary fiber content), and heat to approximately 150° F. Added dry components of binder and soluble dietary fiber powder, in stages with mixing and heating in microwave; step 3: Heated binder to 180° F. and stirred in flavors; step 4: Added binder to dries and stirred with spatula to distribute; step 5: Placed 160 g into bar press mold and compressed soy crisp and binder mixture to a height of 10-12 mm, and removed core component and chilled in freezer 5-10 minutes; step: 6. For caramel component layer, sheeted a remaining portion of the fiber caramel composition (30% fiber) to 2.5-3.0 mm thickness and chilled in freezer, and removed from freezer, cut caramel square and placed on crisp core; and step 7: Cut caramel layered core component to desired dimensions and enrobed with compound coating.

The sensory test methods and results were as follows. Three groups of consumer panelists were used in the tests. Taste tastes were all held at a common site. All participants were screened to be users of multiple brands of energy/nutrition bars. The first group represented the broadest target group; a second group was comprised of target consumers and the third group was recruited as users of Powerbar Pria® bars.

After being exposed to a brief product description, each group was served two (or three) bars in a chocolate flavor (triple layer or cereal-bar format plus a Pria® bar as a control) and two versions of a peanut butter flavor. Both peanut butter prototypes were made in the cereal bar format and the only difference was in the drizzle—chocolate or peanut butter.

In more detail, in the chocolate flavored bars, the chocolate flavor was represented by two test bars—a triple layer combination of soy crisps with a layer of caramel fully enrobed in milk chocolate representing an embodiment of the present invention (Product 1) and cereal bars consisting of chocolate soy crisps with chocolate drizzle (Product A1) or peanut butter soy crisps with peanut butter drizzle (Product A2). The products were evaluated in a sequential monadic manner. The order of presentation of Product 1 and product A1 or A2 was systematically rotated across respondents to avoid order bias. Each product was served on a white paper plate. For comparison, all groups were served at least one of the Pria® bars (Product B). In the first and third groups, the Pria® bar served was the peanut fudge flavor. In the middle group, a double chocolate flavor was used as Product B. Product B was always the third option tasted.

From a qualitative standpoint, the triple-layer bar format of Product 1 outscored the drizzled cereal bar formats amongst almost all the consumer panelists. That is, the vast majority of panelists favored the triple-layer bar over the cereal bar format from standpoints of taste, texture and visual appearance. The low calorie triple layer's soft caramel layer was found to be a major factor that caused it to outscore the cereal bar format for almost all participating consumers. Many panelists opined that the triple layer nutrition bar looked like a candy bar. The triple layer bar also tended to outscore the Pria® bar relative to participating consumers who were not currently Pria® bars users. Even among current Pria® bars users participating in the study, the results of the study indicated that triple layer format of Product 1 was about at parity with Pria® bars. Among other specific consumer feedback, the peanut butter cereal bar format variant definitely lacked peanut butter taste impact according to participating consumers. Many panelists complained that the peanut butter cereal bar had no flavor. While the chocolate flavor cereal bar variant more clearly communicated a chocolate flavor, many consumers indicated a desire for a stronger chocolate impact as well. The drizzle appearance used on the cereal bars was somewhat polarizing, particularly when executed in the peanut butter flavor. Some panelists liked the drizzled look and thought it was highly appealing. Almost as many disliked the look and thought it looked unappealing. In the non-chocolate cereal bar version, it was most often compared to a Rice Krispie bar.

Almost one-third of the panelists gave Product 1 the highest possible rating and on a monadic scale of 1 to 9. It scored an average of: Group 1: 7.7; Group 2: 7.7; Group 3: 5.7. Only in the third group, which had tasted the peanut butter samples before tasting the chocolate samples, was there a more polarized reaction. In this group, four of the panelists gave it a rating of 7, 8 or 9 and two gave it a rating of 1 or 2. Almost universally, consumers complained that there is almost no taste to the chocolate and peanut butter drizzle cereal bars (A1, A2). The few who do pick up on a peanut butter note say it was really almost too light to be detectable. It was described as more of an aroma than a taste. The drizzle also did not carry the flavor it visually suggests. Many thought the peanut butter drizzle was actually a caramel or butterscotch drizzle from the appearance. Although Product A1 was liked for being crispy and crunchy, the panelists did not think it had enough chocolate impact and quite a few complained that it had no taste. On the whole, Product 1 was deemed superior over Product A1, and A2, in a direct comparison by the panelists.

Example 2

Taste tests were conducted as consumer interviews/surveys on the three different types of triple-layer bars: vanilla caramel crisp, chocolate caramel crisp, and peanut butter crisp, which were made using the general process scheme as described in Example 1 except using the formulations described in Tables 1-3 below, or a variation thereof as explained below. The peanut butter and chocolate caramel crisp triple-layer bar formulations of Tables 1-2 each delivered 3.0 g total saturated fat content, while the vanilla bar formulation of Table 3 was adjusted for this study to deliver 2.5 g saturated fat instead of 3.0 g per the formulation. 2.5 g saturated fat content versions of the chocolate caramel and peanut butter crisp bars also were prepared by adjusting the saturated fat content of the respective formulation. For the chocolate caramel crisp bar, the 3.0 g saturated fat bar is identified as bar "2A" herein, while the 2.5 g saturated fat content bar version thereof is identified as bar "2B" herein.

TABLE 1

Peanut Butter Flavor Triple-Layer Bar

| Ingredient | % |
|---|---|
| Intermediate Caramel w/Fiber Layer | 24.5 |
| Soy Protein Crisps | 21.5 |
| Enrobing Peanut Butter Flavored Coating (w/Fiber) | 21 |
| Brown Rice Syrup | 6 |
| Evaporated Cane Juice Syrup | 3.5 |
| Maltitol Syrup | 3.5 |
| Caramel w/Fiber (added to core) | 3 |
| Peanut Butter Flavored Coating w/fiber (added to core) | 3 |
| Peanut Butter | 2 |
| Inulin | 2 |
| Glycerin | 1.5 |
| Oligofructose | 1.5 |
| Tricalcium Phosphate | 2 |
| Natural Flavors | 2 |
| Vitamin/Mineral Premix | 1 |
| Magnesium Oxide | 0.5 |
| Water | 0.5 |
| Salt | 0.5 |
| Granulated Sugar | 0.5 |
| TOTAL | 100 |

TABLE 2

Chocolate Flavor Triple-Layer Bar

| Ingredient | % |
|---|---|
| Intermediate Caramel w/Fiber Layer | 24.5 |
| Soy Protein Crisps | 21.5 |
| Enrobing Chocolate Flavored Coating (w/Fiber) | 21 |

TABLE 2-continued

Chocolate Flavor Triple-Layer Bar

| Ingredient | % |
| --- | --- |
| Brown Rice Syrup | 6 |
| Evaporated Cane Juice Syrup | 3.5 |
| Maltitol Syrup | 3.5 |
| Caramel w/Fiber (added to core) | 3 |
| Chocolate Flavored Coating w/ fiber (added to core) | 3.5 |
| Chocolate Liquor | 2 |
| Inulin | 2 |
| Glycerin | 1.5 |
| Oligofructose | 0 |
| Tricalcium Phosphate | 2 |
| Natural Flavors | 2 |
| Vitamin/Mineral Premix | 1 |
| Magnesium Oxide | 0.5 |
| Water | 0.5 |
| Salt | 0.5 |
| Granulated Sugar | 1.5 |
| TOTAL | 100 |

TABLE 3

Vanilla Flavor Triple-Layer Bar

| Ingredient | % |
| --- | --- |
| Intermediate Caramel w/Fiber Layer | 24.5 |
| Soy Protein Crisps | 21.5 |
| Enrobing Peanut Butter Flavored Coating (w/Fiber) | 21 |
| Brown Rice Syrup | 6 |
| Evaporated Cane Juice Syrup | 3 |
| Maltitol Syrup | 3.5 |
| Caramel w/Fiber (added to core) | 4 |
| Vanilla Flavored Coating w/fiber (added to core) | 5 |
| Butter | 1 |
| Inulin | 2.5 |
| Glycerin | 1.5 |
| Oligofructose | 2 |
| Tricalcium Phosphate | 2 |
| Natural Flavors | 2 |
| Vitamin/Mineral Premix | 1 |
| Magnesium Oxide | 0.5 |
| Water | 0.5 |
| Salt | 0.5 |
| Granulated Sugar | 0.5 |
| TOTAL | 100 |

The testing/survey protocol used was as follows. Respondents were interviewed in person. A qualified respondent was the female head of household, 25-54 years of age (33% in each age group: 25-34, 35-44, 45-54), and must have been the primary grocery shopper (all or most of the food shopping). The respondent had to be current consumers of nutrition/energy bars and could specifically name a least one commercial brand name of such bars among a preselected list of about 23 commercial products. They also had to be at least somewhat interested in trying vanilla, chocolate, and/or peanut butter flavors. Standard security/guidelines and validation and medical/dietary screening (including food sensitivity to milk/dairy products, wheat, and peanuts/tree nuts) were also conducted. Two products of each flavor (i.e., vanilla caramel crisp, chocolate caramel crisp, and peanut butter crisp) were tested (6 products total). Respondents tasted both products within one flavor. Each respondent tasted 2 products. There were approximately 150 judgments per product. The products were evaluated in a sequential monadic manner. The order of presentation was systematically rotated across respondents to avoid order bias. Each product was served on a white paper plate.

The taste results for the 3.0 g and 2.5 g saturated fat content chocolate caramel bars (2A, 2B) are summarized in FIGS. 5-8. The products received generally favorable reviews and comments by the consumer-respondents from all sensory standpoints interviewed upon. The vanilla caramel and peanut butter bars also generally obtained favorable reviews from the respondents. Still referring to FIGS. 5-8, the "1st position" results refer to results for which the respondent tasted the chocolate caramel crisp bar first. In FIGS. 5-8, an "s" or "d" next to a number indicates that it is statistically higher than the other product. An "s" represents a significant difference at the 95% confidence level and a "d" represents a directional difference at 90% confidence level. Some bars were inadvertently damaged during in some manner during production, and respondents were not asked to assess their appearance.

Example 3

Triple-layer bars in 90-110 Cal/28 g serving sizes that delivered 5 g of protein and 5 g of dietary fiber, and which contained 22 vitamins and minerals such as calcium were manufactured on a commercial-scale production line in three flavors: Chocolate Caramel, Vanilla Caramel, and Peanut Butter Caramel. The respective triple-layer bars were formulated to have compositions generally corresponding to the applicable formulations as described above in Tables 1-3, and reference is made thereto with the following variations. Fiber content of the caramel composition was approximately 45%. The use of sugar alcohols were to be kept at the lowest possible levels in order to distinguish the bar from conventional dense core triple-layer bars containing significant sugar alcohol content and which have been marketed as "low net carbohydrate" products and the like. A high fiber caramel composition was found to be important in producing the food bar with a good balance of low-calories.

Although the bulk density of the high fiber caramel composition ingredient was increased, the caloric density was lowered due to the higher fiber level. The fiber in the caramel was from short chain fructooligosaccharides (FOS) that are readily solubilized and concentrated in the caramel process and also provide some sweetness. Initially, the viscosity of this caramel was too low to be used as a layering caramel. The viscosity of the caramel was increased and maintained at an acceptable level to permit the caramel to used as a layering caramel by replacing 50% of short chain fructooligosaccharides (FOS) with maltitol. Minor issues with color variation were resolved as the caramel was scaled up. The caloric density of the FOS Caramel was approximately 3-4 calories/g. This caramel was used in both the binder system for the soy-crisp based core as well as for the caramel layer. High fiber compound coatings also were prepared for each bar flavor type. Since sugar alcohols were to be kept to a minimum, compound coatings were formulated using fiber (FOS or inulin) in order to reduce the caloric density of the coatings. Fibers from FOS or inulin in each coating (peanut butter, chocolate, or white/vanilla) were used at levels of 16-18%.

The objectives for the plant trial were to test the processability of six variants (two variants per flavor; 2.5 g sat fat vs. 3.0 g sat fat), to test weight uniformity across all production lanes, and determine finished product dimensions based on a constant product core density and configuration (triple layer bar with a finished bar weight of 28 g). The test was designed to process the variants on a production scale basis in preparation for start-up. The trial proved successful since all of the major goals were attained. Bar dimensions were determined as was the processability of both variant per flavor. Overall it was determined that the higher saturated fat variants of all flavors processed more easily and yielded more visually acceptable product than the lower saturated fat variants, concluding that higher levels of saturated fat are a viable commercial option. Data was collected and analyzed in the subsequent report and it was found that as more process learning was acquired, the weight data became more accurate when compared to pre-established standards. Six variants of 100 calorie, crisp core bars were tested (two variants per flavor, viz. 2.5 g and 3.0 g saturated fat versions). A new crisp base core bar design was tested. The test weight uniformity across lanes as well as testing processability of caramel across all formulas was observed. Test addition of tricalcium phosphate (TCP) into caramel layer also was examined.

The general process used to produce the various flavored test bars followed the general scheme shown in FIG. 4. Among others, the following process conditions were used.

TABLE 4

Process parameters summary

| Unit | Set point | Procedure |
|---|---|---|
| Breddo syrup mixer | 90° C. | Mixed all binder components until combined |
| Caramel Kettle | 90° C. | Combined caramel and MgO Mix until combined |
| Peerless dough mixer | Chocolate Caramel: 40° C. Vanilla Caramel: 40° C. Peanut Butter Caramel: 45° C. | Dropped binder into mixer and added rework (if applicable) until fully combined Added flavor, mixed until combined Dropped protein crisps and mix until combined Care taken to avoid crushing of protein crisps |
| Final dough | Chocolate Caramel: 35° C. Vanilla Caramel: 40–45° C. Peanut Butter Caramel: 35° C. | |
| Target line speed | 550 bars/min | |

During core component slab forming/compression, the compression rolls were kept at low temperatures and lubricated to control sticking of the core dough thereto. The final core slab height was set at 10.0-10.5 mm, and the final caramel slab height was set at 2.5 to 3.5 mm. The enrobing material, i.e., the compound coating. At the cutting station, bar dimensions were varied in order to achieve target weights. Representative examples of different sets of bar dimensions for each type of flavored bar providing the target weights and calorie content are set forth in Table 5.

TABLE 5

Average Bar Dimensions

| | Length (mm) | Width (mm) | Height (mm) |
|---|---|---|---|
| Chocolate Caramel | 72.0 | 28.9 | 17.2 |
| Chocolate Caramel | 70.8 | 29.7 | 18.0 |
| Vanilla Caramel | 72.5 | 31.8 | 18.6 |
| Vanilla Caramel | 69.3 | 30.4 | 20.4 |
| Peanut Butter Caramel | 87.5 | 28.8 | 13.3 |
| Peanut Butter Caramel | 80.1 | 28.8 | 14.6 |
| Peanut Butter Caramel | 85.8 | 29.6 | 14.1 |

All three types of food bar products that were manufactured were flavorful and had a pleasant multiple texture aspect including crunchy and soft components. The results indicated that each of the three flavor varieties of the snack bar could be produced continuously with suitable uniformity and predictability in a commercial production scale environment as flavorful and texturally-pleasant low-calorie food bars.

What is claimed is:

1. A food bar having less than 110 Cal/28 g serving, comprising:
   a core layer comprising, as a unitary matrix, protein crisps, caramel, water-soluble dietary fibers, binder material, and a compound coating;
   a caramel layer separate from the core layer and comprising water-soluble dietary fibers;
   the compound coating separately applied to surface portions of the core layer and the separate caramel layer; and
   wherein the compound coating comprises water-soluble dietary fibers.

2. The food bar of claim 1, wherein said protein crisps comprise a soy source selected from the group consisting of soy protein, peanut protein, wheat germ, whey protein, casein, caseinate, casein hydrolysate, egg protein, and nut meats, and any combination thereof.

3. The food bar of claim 1, wherein the protein crisps comprise soy crisps.

4. The food bar of claim 3, wherein said soy crisps have a bulk density of about 0.2 to about 0.26 g/cm3 and a particle size distribution of at least 60 wt % on #6 Mesh screen.

5. The food bar of claim 1, wherein said core layer comprises about 10 wt % to about 18 wt % water-soluble dietary fiber.

6. The food bar of claim 1, wherein said core layer comprises about 13 wt % to about 15 wt % water-soluble dietary fiber.

7. The food bar of claim 1, wherein the separate caramel layer is located between the core component and a portion of the compound coating.

8. The food bar of claim 1, wherein the caramel and water-soluble dietary fibers of the core layer are present in combination as a high fiber caramel composition.

9. The food bar of claim 8, wherein the separate caramel layer comprises about 20 wt % to about 60 wt % water-soluble dietary fiber.

10. The food bar of claim 8, wherein the separate caramel layer comprises about 25 wt % to about 30 wt % water-soluble dietary fiber.

11. The food bar of claim 1, wherein the compound coating comprises about 20 wt % to about 35 wt % water-soluble dietary fiber.

12. The food bar of claim 1, wherein the compound coating comprises about 25 wt % to about 30 wt % water-soluble dietary fiber.

13. The food bar of claim 1, wherein said food bar comprises about 5 wt % to about 30 wt % total water-soluble dietary fiber.

14. The food bar of claim 1, wherein said food bar comprises about 12 wt % to about 24 wt % total water-soluble dietary fiber.

15. The food bar of claim 1, wherein said food bar comprises about 17 wt % to about 19 wt % total water-soluble dietary fiber.

16. The food bar of claim 1, wherein the water-soluble dietary fibers are independently selected from the group consisting of oligosaccharides, psyllium, beta glucan, oat bran, oat groat, pectin, carrageenan, guar, locust bean gum, gum acacia, and xanthan gum.

17. The food bar of claim 1, wherein the water-soluble dietary fibers comprise fructooligosaccharides.

18. The food bar of claim 1, comprising less than about 15 wt % total sugar alcohols.

19. The food bar of claim 1, wherein the core layer further includes a flavoring selected from peanut butter flavoring, vanilla flavoring, and chocolate flavoring.

20. The food bar of claim 1, wherein the food bar has a water activity (Aw) of less than about 0.60.

21. The food bar of claim 1, wherein the food bar has a water activity (Aw) ranging between about 0.40 and about 0.60.

22. The food bar of claim 1, wherein the food bar contains, per 28 g serving, at least about 5 g protein and at least about 5 g dietary fiber.

23. A food bar having less than 110 Cal/28 g serving, comprising:
a core layer comprising, as a unitary matrix, soy crisps, caramel, water-soluble dietary fibers, binder material, and a compound coating, the soy crisps have a bulk density of about 0.2 to about 0.3 g/cm$^3$ and a particle size distribution of at least 60 wt % on #6 Mesh screen;
a caramel layer separate from the core layer and comprising water-soluble dietary fibers; and
the compound coating applied to surface portions of the core layer and the separate caramel layer;
wherein the core layer comprises about 20 wt % to about 80 wt % soy crisps, about 5 wt % to about 15 wt % caramel, about 10 wt % and about 18 wt % water-soluble dietary fiber, and about 10 wt % to about 30 wt % binder material;
the separate caramel layer comprises about 80 wt % to about 65 wt % caramel and about 20 wt % to about 35 wt % water-soluble dietary fiber;
the compound coating comprising about 25 wt % to about 35 wt % fat source, and about 20 wt % to about 35 wt % water-soluble dietary fiber; and
wherein said food bar comprises less than about 15 wt % total sugar alcohols and about 5 wt % to about 30 wt % total water-soluble dietary fiber, and has a water activity (Aw) less than about 0.60.

24. A food component comprising, a core layer as a unitary matrix, including soy protein crisps, caramel including water-soluble dietary fiber, additional water-soluble dietary fiber separate from the caramel, and binder material; separate caramel layer including water-soluble dietary fibers; and a separate compound coating including water-soluble dietary fibers, wherein the food component contains about 5 to about 30 weight percent water-soluble dietary fibers supplied from four separate sources in the food component and less than about 15 wt % total sugar alcohols, and has a water activity (Aw) of less than about 0.60.

25. A food bar having less than 110 Cal/28 g serving, comprising:
a core layer comprising, as a unitary matrix, protein crisps, caramel, water-soluble dietary fibers, binder material, and compound coating, the core layer including about 10 wt % to about 18 wt % water-soluble dietary fiber based on the weight of the core layer;
a caramel layer separate from the core layer and comprising water-soluble dietary fibers, the separate caramel layer including about 20 wt % to about 60 wt % water-soluble dietary fiber based on the weight of the separate caramel layer;
the compound coating also separately applied to surface portions of the core layer and the separate caramel layer; and
wherein the compound coating comprises water-soluble dietary fibers.

26. The food bar of claim 25, wherein the compound coating comprises about 20 wt % to about 35 wt % water-soluble dietary fiber based on the weight of the compound coating.

27. The food bar of claim 26, wherein said food bar comprises about 5 wt % to about 30 wt % total water-soluble dietary fiber.

28. The food bar of claim 25, where the water activity (Aw) of each of the core layer and the separate caramel layer is the same so that the moisture content of the food bar is equalized between the core layer and the separate caramel layer.

* * * * *

UNITED STATES PATENT AND TRADEMARK OFFICE
CERTIFICATE OF CORRECTION

PATENT NO.         : 8,486,469 B2                                          Page 1 of 1
APPLICATION NO.    : 11/250425
DATED              : July 16, 2013
INVENTOR(S)        : Coleman et al.

It is certified that error appears in the above-identified patent and that said Letters Patent is hereby corrected as shown below:

IN THE CLAIMS:
Column 22, line 4, claim 24, delete "separate" and insert --a separate-- therefor.

Signed and Sealed this
Third Day of June, 2014

Michelle K. Lee
*Deputy Director of the United States Patent and Trademark Office*